United States Patent Office
3,430,150
Patented Feb. 25, 1969

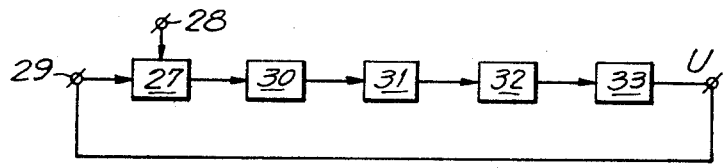
FIG.7

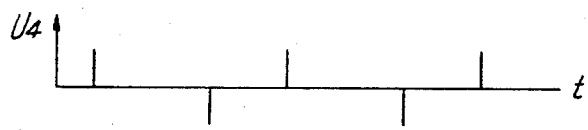
FIG.8c
FIG. 9a
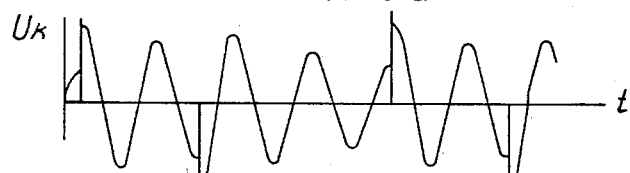
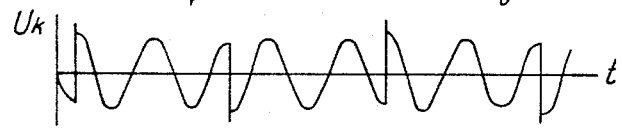
FIG.9b

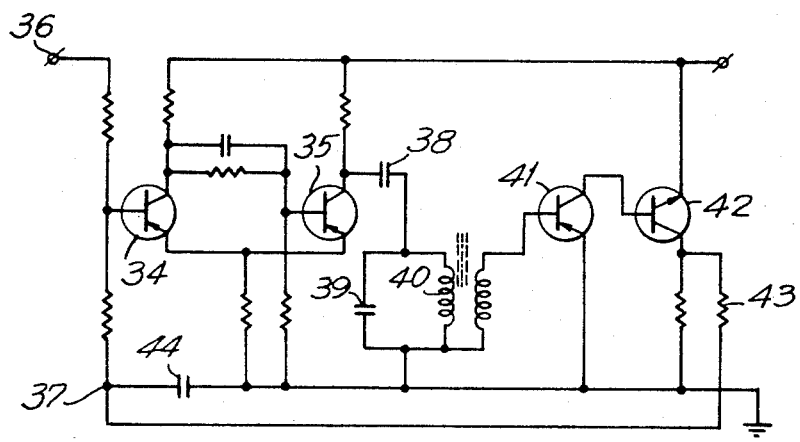
FIG. 10
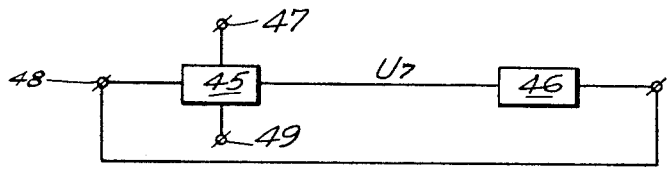
FIG. 11
FIG. 12a
FIG. 12b
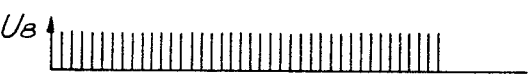
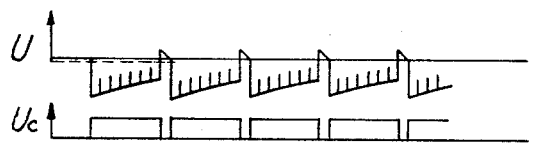
FIG. 12d

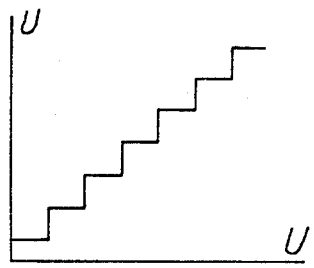
FIG. 13
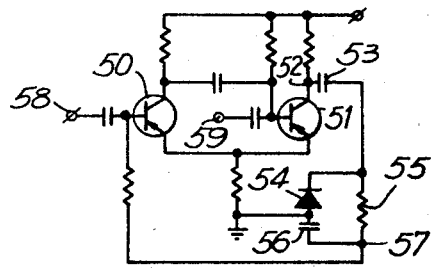
FIG. 14
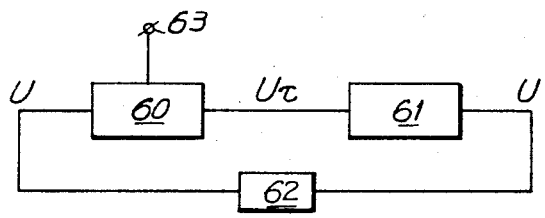
FIG. 15
FIG. 16a
FIG. 16b
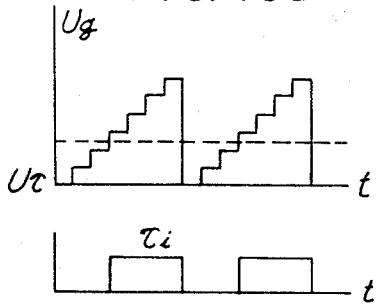
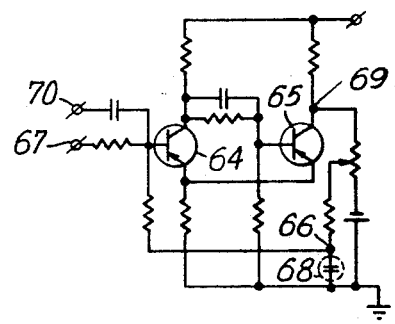
FIG. 17

3,430,150
PULSE WIDTH CONTROL SYSTEM WITH N-STABLE STATES OF DYNAMIC EQUILIBRIUM
Vitaly Petrovich Sigorsky, Leonid Semenovich Sitnikov, Lev Lazarevich Utjakov, Anatoly Nickolaevich Boiko, Alexandr Artemjevich Molchanov, and Jury Semenovich Osjagin, Novosibirsk, U.S.S.R., assignors to Institute Matematiki Sibirskogo Otdelenia Akademii, Nauk, U.S.S.R.
Filed Aug. 19, 1964, Ser. No. 390,690
U.S. Cl. 328—205    6 Claims
Int. Cl. H03k 3/14, 3/26, 5/20

ABSTRACT OF THE DISCLOSURE

A device having many stable states of dynamic equilibrium, which differ in the output pulse duration, in which the number of active and passive elements used does not depend on the number of stable states, in the form of a nonlinear four-pole network with a nonmonotonic amplitude characteristic, comprising a D.C. voltage-to-time parameter converter and a time parameter-to-D.C. voltage converter connected in series, with feedback.

---

The present invention relates to a device having many stable states of dynamic eqpuilibrium, used in automatic, remote control systems, computing systems etc. and which further will be referred to hereinafter as a chronotron.

It is well known that an increase in the number of stable states of a device results in most cases in a proportional increase in the equipment required, which reduces the reliability of the device and its efficiency.

For example, when using binary cells for obtaining four stable states, two cells are required, and for obtaining ten stable states four cells are required.

Attempts have been made to decrease the amount of the required equipment by developing new elements having two and more stable states. Phase-stable circuits and multistable parametrons serve as an example of such elements.

Stable states in the phase-stable circuits are characterized by a continuous sequence of pulses, having distinguishable phase relation to the sequence of reference pulses.

In spite of the fact that the phase-stable circuit itself is simple and there is a possibility of increasing the number of stable states without making it more complex, it has not been widely used, since for designing devices using these elements, additional circuits are required to change a phase relation for bringing it from one stable state into another.

Stable states in multistable parametrons are characterized by the phase of oscillations. Thus, $n$ possible subharmonic stable phases, shifted with respect to each other by $2\pi/n$ correspond to a certain phase of oscillations of fundamental frequency (boost frequency). At a large value of $n$, the excitation of the oscillations becomes difficult and therefore parametrons having two stable states have been used in practice. Previous attempts to increase the number of stable states has resulted in considerable complication of the oscillator circuit.

An object of the present invention is to eliminate the drawbacks mentioned above and create a simple and efficient device having many stable states of dynamic equilibrium, which differ in duration of square pulses.

Another object of the present invention is to ensure a reliable control of the given device.

In conformity with the mentioned above and other objects, the invention consists of a new device, a chronotron, made in the form of a nonlinear four-pole network with a nonmonotonic amplitude characteristic, comprising a D.C. voltage-to-time parameter converter and time parameter-to-D.C. voltage converter connected in series, and provided with a feedback.

Other objects and advantages will be apparent from the description given below and the accompanying drawings in which.

Figure 3:
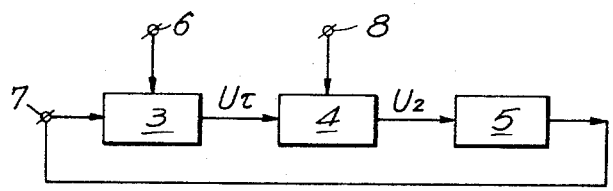
Figure 4A:
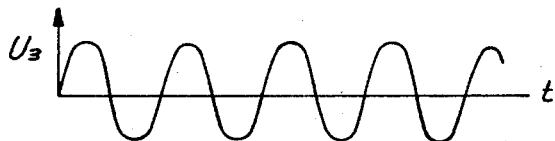
Figure 4B:
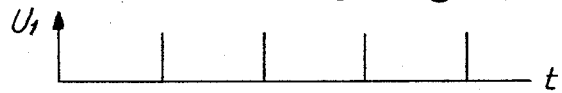
Figure 4C:
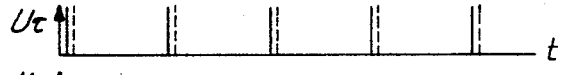
Figure 4D:
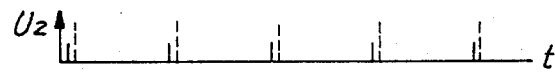
Figure 5:
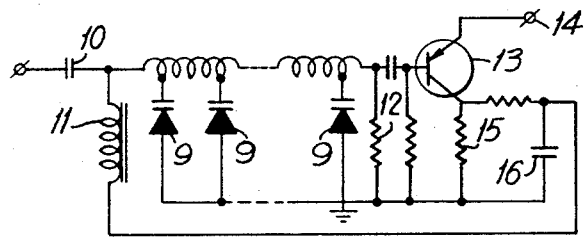
Figure 6:
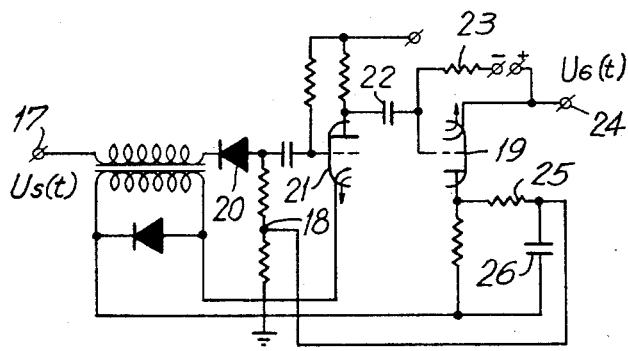
Figure 8A:
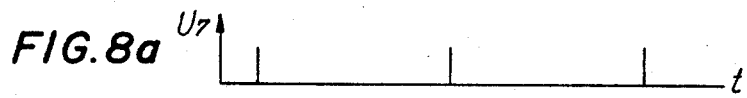

FIGS. 4a, b, c, d represent diagrams of the voltage change in different points of the block-diagram of FIG. 3;

FIG. 5 is a schematic circuit diagram of a chronotron, employing an electromagnetic delay line;

FIG. 6 is a schematic circuit diagram of a chronotron, in which a diode-regenerative comparator is used as an adjustable delay unit;

FIG. 7 is a block-diagram of a chronotron, in which an oscillatory circuit is used;

FIGS. 8a, b represents voltage diagrams of the one-shot multivibrator of the block-diagram of FIG. 7; FIG. 8c represents a sequence of pulses of opposite polarity at the differentiating circuit output;

FIGS. 9a, b shows a voltage versus time diagram of an oscillatory circuit of the block-diagram of FIG. 7;

FIG. 10 is a schematic circuit diagram of the chronotron according to the block-diagram of FIG. 7;

FIG. 11 is a block-diagram of a chronotron employing a one-shot multivibrator with a nonmonontonic conversion of voltage to pulse duration;

FIGS. 12a, b, c, d represents diagrams of voltage at various points of the block-diagram of FIG. 11;

FIG. 13 is an amplitude characteristic of the four-pole network according to the block-diagram of FIG. 11;

FIG. 14 is a schematic circuit diagram of the chronotron according to the block-diagram of FIG. 11;

FIG. 15 is a block-diagram of a chronotron employing a comparator with a nonmonotonic conversion of voltage to pulse duration.

FIG. 16a is a diagram of the triggering voltage of the chronotron according to the block-digram of FIG. 15; FIG. 16b is a diagram of pulses in one of the points of the block-diagram of FIG. 15.

FIG. 17 is a schematic circuit diagram of the chronotron according to the block-diagram of FIG. 15.

A device having many stable states can be designed on the four-pole basis of a network, the amplitude characteristic of which is expressed by a nonlinear function $$V_{out} = \varphi(V_{in}) \qquad (1)$$

When applying a feedback circuit around such a network the following condition is imposed on it:

$$V_{out} = \frac{1}{K_{ampl}} V_{in} + V_o \qquad (2)$$

where $K_{ampl}$ is a feedback circuit amplification factor, and $V_o$ is the bias D.C. voltage in the feedback circuit input.

Figure 1:
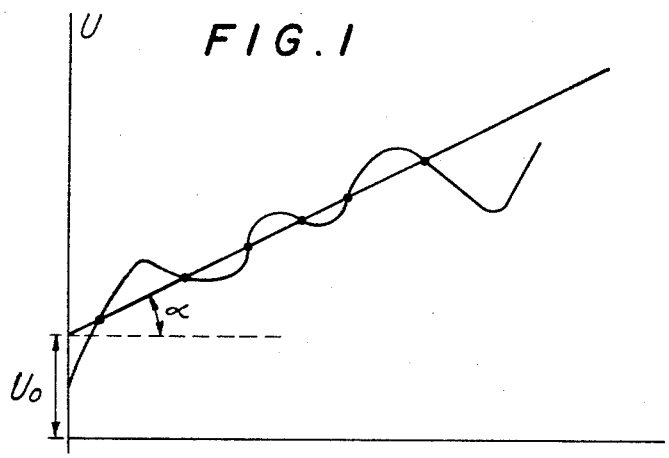
FIG. 1 shows a nonmonotonic amplitude characteristic of a nonlinear four-pole network with a superimposed feedback circuit.

The points of intersection of the network amplitude characteristics with the feedback line (FIG. 1) correspond to the device equilibrium states. The number of these states is defined by the number of the roots of the set of Equations 1 and 2 and depends on the form of the amplitude characteristic and on the position of the feedback line with respect to it.

The required position of this line can be provided by selection of the corresponding values of bias voltage $V_o$ and amplification factor $K_{ampl}$ defining the angle of inclination of the feedback line relative to the X-axis.

The required amplitude characteristic can be obtained by using diode functional generators. However, increase in the number of stable states is associated with a complication of the device.

Figure 2:
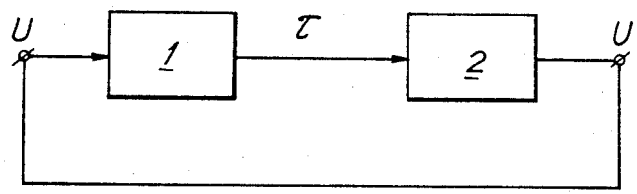
FIGS. 2 and 3 represent block-diagrams of the four-pole networks used for the design of the chronotron.

It is found that a nonlinear four-pole network with the required amplitude characteristic can be obtained by using converter 1 (FIG. 2) converting D.C. input voltage $V_{in}$ to time parameter $\tau$ (e.g. square pulse duration) with subsequent conversion of the time parameter to D.C. output voltage $V_{out}$ in converter 2, i.e. the following relations should be observed:

$$V_{out} = \varphi_1(\tau) \qquad \tau = \varphi_2(V_{in})$$

When said four-pole network is provided with a feedback, stable states of dynamic equilibrium, which differ in pulse duration and in output voltage value, appear in it.

One of the most universal versions of the design of such a four-pole network is a series connection of adjustable delay unit 3, gating circuit 4 and integrator 5 (FIG. 3). The period of the delay unit output voltage $V_\tau$, which is determined by the period of triggering voltage $V_I$ supplied to terminal 6, and delay time is a function of control voltage $V_{in}$ applied to terminal 7. Voltage $V_2$ at the gating circuit 4 output is a function of the time relation between voltage $V_\tau$ and additional voltage $V_3$ applied to terminal 8. Voltage $V_{out}$, which is a function of voltages $V_{in}$, $V_I$, $V_3$, is generated at the integrator output.

Let a periodic sequence of short pulses be used as triggering voltage $V_I$. At the adjustable delay unit, which in this case is represented by a one-shot multivibrator with a differentiation circuit, short pulses are generated, the period of their passing being defined by the triggering voltage $V_1$ period, and delay time, by the value of control voltage $V_{in}$. Voltage $V_2$ at the gate output is in the form of pulses, whose amplitude is determined by an instantaneous value of voltage $V_3$ at the moment when delayed pulse $V_\tau$ is generated. At a constant repetition frequency and duration of pulses $V_2$, the D.C. voltage $V_{out}$ value in the integrator output is proportional to its amplitude.

If voltages $V_1$ and $V_3$ are synchronized with respect to each other and the voltage $V_\tau$ delay value with respect to $V_1$ is a linear function of $V_{in}$, the amplitude characteristic of the four-pole network $V_{out} = \varphi(V_{in})$ has the same form as the time relation $V_3 = \varphi(t)$. Indeed, let voltage $V_3$ be a sine curve (FIG. 4a), and trigger pulses $V_1$ are applied at the moment when the sine curve passes through the X-axis upwards.

Then, with control voltage $V_{in}$ equal to zero, the moments of generation of pulses $V_\tau$ coincide with the moments when the trigger pulses arrive, and since at these moments the instantaneous value of additional voltage $V_3$ is equal to zero, voltage $V_2$ pulses are not generated and D.C. voltage $V_{out}$ is also equal to zero.

With an increase in control voltage $V_{in}$ pulses $V_\tau$ are shifted with respect to $V_1$ by some value $\tau$. In this case the amplitude of pulses $V_2$ can be expressed through $\tau$ and $V_{in}$ in the following way:

$$V_2 = K_1 \cdot \sin K_2 \cdot \tau = K_1 \sin K_3 \cdot V_{in}$$

where $K_1$, $K_2$, $K_3$ are constant factors.

Therefore, the form of the amplitude characteristic $V_{out} = \varphi(V_{in})$ is similar to the voltage versus time diagram $V_3 = \varphi(t) = V_0 \sin \omega t$. The use of sawtooth, rectangular, or some other shape of voltage $V_3$ permits obtaining amplitude characteristics of the appropriate form in the four-pole network according to the described block-diagram.

In the case when the period of triggering voltage $V_1$ is several times more than that of additional voltage $V_3$, the zero output voltage $V_{out}$ corresponds to all the values of $V_{in}$, at which delayed pulses $V_\tau$ coincide with one of the moments when voltage $V_3$ becomes equal to zero. It is evident that at a monotonic change in $V_{in}$, the value of $V_{out}$ is changed nonmonotonically, several times running through all the values from the maximum to the minimum.

The principal requirements for the adjustable delay unit from the point of view of its use in the chronotron are: maximum possible range of delay variation, high sensitivity, specific relationship of change $\tau = \varphi(V_{in})$ (usually linear), highest possible sharpness of the edges and higher output pulses amplitude, as well as simplicity and efficient operation.

One-shot multivibrator or other biased multivibrator circuits can be used as an adjustable delay unit. Various kinds of comparators (comparing devices) can also be used. In this case it is advisable to choose a sawtooth voltage $V_1$ which ensures strictly linear dependence of delay value $\tau$ on control voltage $V_{in}$.

The adjustable delay unit can also employ a purely time delay element, e.g. a long or artificial line, electromagnetic, magnetic tape recorder. In this case, voltages of various forms, e.g. rectangular, sawtooth, sharp peak and others, can be used as voltage $V_1$.

If a sharp peak voltage is used, the adjustable delay unit does not comprise a differentiator.

An electromagnetic line with nonlinear capacitors, e.g. with semiconductor diodes 9, is used as an adjustable delay unit in the chronotron, the schematic circuit diagram of which is shown in FIG. 5.

Time pulses and control voltage are applied to the line input through capacitor 10 and through choke 11 respectively. The line output is connected to matching resistor 12. The pulses from the delay line are applied to the coincidence circuit. The latter employs transistor 13. With no time pulse applied, the transistor base normally does not conduct.

Sawtooth voltage $V_4(t)$ which is supplied to terminal 14 with fixed bias is applied at the input of the transistor so that the emitter voltage of transistor 13 is changed with respect to the ground from zero to $+V_4$ max. With no time pulse applied, the transistor internal resistance considerably exceeds collector load resistor 15, and the collector voltage is near zero irrespective of the sawtooth voltage instantaneous value.

At the moment of appearance of the delayed pulse at the base, the transistor starts conducting to saturation, and a voltage pulse, the amplitude of which is determined by the instantaneous value of sawtooth voltage $V_4(t)$, is produced in resistor 15. This pulse additionally charges capacitor 16.

The voltage $V_4(t)$ direct component is proportional to the pulse amplitude at the collector.

The voltage from capacitor 16 is supplied to the delay line through choke 11 and fed to the junctions of diodes 9 controlling their capacitance and changing the delay time.

Thus, the delay time determines the value of the collector voltage of transistor 13 and, in its turn, is determined by this voltage, i.e. the whole device turns out to be provided with a feedback loop and can have several stable states.

FIG. 6 shows a schematic circuit diagram of the chronotron using a more simple adjustable delay unit—a diode-regenerative comparator.

Sawtooth voltage $V_5$ is applied to the diode-regenerative comparator input 17. At the moment when this voltage at point 18 is equal to the control voltage from the anode of tube 19, diode 20 which normally does not conduct, starts conducting, the positive feedback transformer circuit is closed for a time and tube 21 is cut off. In this case a positive square pulse, the duration of which is determined by the value of the control voltage, is picked up from the anode of the tube.

After differentiating by RC-circuit 22, 23 a positive pulse, corresponding to the moment when the voltages are equal, is applied to the grid of tube 19. Driving sawtooth voltage $V_6$ changing from 0 to 80 v., the period of which is 10–20 times more than that of sawtooth voltage $V_s$ fed to the comparator, is applied to the cathode of this tube through terminal 24, both voltages being synchronized with respect to each other.

Depending on the value of delay $\tau$ the anode voltage of tube 19 is either raised or lowered. This voltage after being smoothed by RC-circuit 25, 26 is used for controlling the delay time.

Ten stable states have been obtained in the chronotron shown in FIG. 6. Delay and control voltage values changed practically linearly when the chronotron passed from one state to another.

Time-pulse multistable elements with four-pole networks, in which the time parameter is nonmonotonically converted to the D.C. voltage $V_{out}$ value by the gate circuit, to one of the inputs of which additional voltage is supplied, were considered above. However, the use of two additional voltages is often undesirable.

In such cases for the conversion mentioned above, it is advisable to use the arrangement described below, which does not require additional voltage. The block-diagram of the four-pole network, in which this arrangement is used, is shown in FIG. 7, wherein:

27 is a generator of square pulses, the repetition frequency of which is defined by periodic signal $V_7$ applied to terminal 28, and the duration of which is defined by the value of D.C. input voltage $V_{in}$ applied to terminal 29;

30 is a differentiation circuit;

31 is an oscillatory circuit, the natural frequency of which exceeds several times the repetition frequency of square pulses $V_\tau$ at the output of unit 27.

32 is a detector with a smoothing filter;

33 is a D.C. amplifier.

The principle of operation of the device is the following.

Figure 8B:
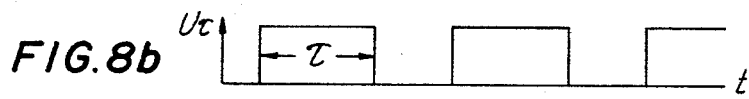

Triggering pulses $V_7$ are applied to the input of unit 27, e.g. to the input of a one-shot multivibrator with a fixed pulse repetition frequency (FIG. 8a). Square pulses duration $V_\tau$ (FIG. 8b) at the one-shot multivibrator output can be controlled by changing the D.C. input voltage $V_{in}$. When square pulses are applied to differentiation circuit 30, there appears at the output a sequence of opposed-polarity spike pulses $V_8$ (FIG. 8c), the frequency of which is determined by the frequency of the triggering pulse and negative one is determined by the square pulse duration $\tau$.

The opposed-polarity pulses are applied from the differentiation circuit 30 output to oscillatory circuit 31, the natural frequency of which exceeds the frequency of pulse repetition by several times.

The arrival of a positive pulse causes shock excitation of the circuit. If a negative pulse appears after the time interval $$\tau = \frac{2n+1}{4\pi\omega\kappa}$$

(FIG. 9a), where $\omega\kappa$ is the natural frequency of the circuit oscillations and $n$ is the ratio of this frequency to the pulse repetition frequency, the positive and negative pulses are summed up and the amplitude of the circuit oscillations will be maximum. If a negative pulse appears after the time interval $$\tau = \frac{n}{2\pi\omega\kappa}$$

(FIG. 9b), the positive and negative pulses are balanced and the amplitude of oscillations is minimum.

Thus, a time parameter of a pulse sequence can be converted into the corresponding value of D.C. voltage without using additional voltage, but using an oscillatory circuit tuned to one of the components of the sequence spectrum.

A specific example of a time-pulse multistable element with a nonlinear network according to the block-diagram of FIG. 7 is represented in the schematic circuit diagram in FIG. 10.

Used as a generator of square pulses with adjustable duration is a cathode-coupled one-shot multivibrator, employing transistors 34 and 35. Triggering positive pulses with a repetition frequency of 10 c.p.s. are applied to the one-shot multivibrator input through terminal 36. The duration of the one-shot multivibrator input pulse is maintained from $\tau_{min.}=5$ $\mu$sec. to $\tau_{max.}=80$ $\mu$sec. by changing the D.C. voltage at point 37 from $-0.5$ to $-1.5$ v.

The pulses from the one-shot multivibrator output are applied to parallel oscillatory LC-circuit 39, 40 through capacitor 38. The circuit active loss resistance in conjunction with capacitor 38 form a differentiation circuit, due to which the circuit is directly affected only by the square pulse edges, i.e. a sequence of short opposite-polarity pulses is generated in the circuit, the time interval between the generation of a positive pulse and an adjacent negative one being defined by the duration of the square pulse.

The circuit voltage is detected by the transistor 41 base-emitter junction, amplified by transistors 41 and 42 and then smoothed by RC-circuit 43, 44.

With the feedback loop being closed in the chronotron, 12 stable states were obtained (circuit natural frequency 160 c.p.s.).

With the circuit natural frequency lowered to 100 c.p.s., the number of stable states is reduced to 8, and with the circuit frequency increased to 250 c.p.s. the number of stable states is increased to 21. A further increase in the circuit frequency resulted in disappearance of the stable states. By appropriate selection of initial bias with an increase in the amlifier gain, the number of stable states was increased up to 47 (circuit frequency 550 c.p.s.).

However, in this case, the system became very critical to parameter values.

A further increase in the number of stable states would be impossible due to a comparatively long duration of the one-shot multivibrator output pulse edges (0.5 and, respectively, 0.3 $\mu$sec.) and due to a limited value of the circuit factor of merit ($Q=120$).

In all the cases considered above the input voltage was converted into pulse duration monotonically, usually even linearly, and a nonmonotonic amplitude characteristic of the whole four-pole network was obtained due to a nonmonotonic conversion of the time parameter into voltage. Meanwhile, by using nonmonotonic conversion of voltage into duration, the circuit of a multistable element can be essentially simplified, if the second converter is made in the form of a conventional integrator.

FIG. 11 shows a four-pole network block-diagram consisting of one-shot multivibrator 45 and integrator 46.

To trigger the one-shot multivibrator, a sequence of triggering pulses $V_6$ applied to terminal 47 at constant repetition frequency $f_n$ is used (FIG. 12a). The one-shot multivibrator output pulse duration is controlled by varying the value of control voltage $V_{in}$ applied to terminal 48. Pulses $V_7$ are applied from the one-shot multivibrator output to integrator 46, D.C. voltage $V_{out}$ at the output of which is proportional to the product of a pulse duration by its amplitude. With a change in control voltage $V_{in}$ the pulse duration is changed monotonically, in the first approximation linearly, therefore, the four-pole network amplitude characteristic has the form of a straight line.

It is evident that to obtain the required nonmonotonic amplitude characteristic, it is necessary to provide for a nonmonotonic relationship $\tau = \varphi(V_{in})$.

Next will be considered some features of the one-shot multivibrator "turnover" process. With the arrival of a triggering pulse, the triode, which has been conducting ceases to conduct, and the triode formerly nonconducting, starts to conduct. As a result of this, the timing capacitor is suddenly recharged, and then it begins discharging through the leakage resistor of the normally conducting triode, a high cut-off voltage being maintained at its base. At the moment when the changing voltage at the base is equal to threshold voltage $V_{thresh}$, the triode begins to conduct a little again, and due to the positive feedback, the process is of an avalanche-type and the circuit suddenly returns to its initial position, in which it remains until the next triggering pulse comes.

With a change in the value of control voltage $V_{in}$, the threshold voltage level is changed, and thus the moment equalizing the base voltage and threshold voltage and determining the one-shot multivibrator output pulse duration is shifted in time. It is obvious that if the equalizing moment is changed suddenly, the pulse duration will also be changed suddenly.

This can be done if a sequence of pulses $V_8$ having a period several times less than that of triggering pulses $V_6$ and strictly in phase with them (FIGS. 12a and b) is applied to the base of the temporarily nonconducting transistor (to terminal 49 according to the block-diagram in FIG. 11). Then due to summation of voltages the base voltage change diagram will take the form shown in FIG. 12c.

As it is seen from the drawing, the moment of equality of voltages and that of the circuit reversal in a certain range of voltage $V_{thresh}$ variations, does not depend on the capacitor discharge process and coincides with the moment of applying one of the positive "resetting" pulses $V_8$. With a change in control voltage $V_{in}$, the threshold voltage changes and the moment of the circuit reversal is changed suddenly coinciding as before in time with the moment of applying one of the resetting pulses $V_8$. The amplitude characteristic of the system will attain the form shown in FIG. 13, i.e. with a change in input voltage $V_{in}$, output voltage $V_{out}$ remains unchanged, then, at a small increase in $V_{in}$ voltage, $V_{out}$ is suddenly changed by a fixed value. With a further change in $V_{in}$, the process is repeated several times. It is evident that in the block-diagram in FIG. 11 instead of the one-shot multivibrator any other biased multivibrator can be used, e.g. a phantastron circuit, sanaphant, controlled by duration.

In the chronotron schematic circuit diagram shown in FIG. 14 corresponding to the block-diagram in FIG. 11) one-shot multivibrator employing transistors 50 and 51 with emitter coupling is used as an adjustable duration square pulse shaper. Square pulses are applied from one-shot multivibrator output 52 through a clamping unit, consisting of capacitor 53 and 54, to RC-circuit 55, 56, at output 57 of which D.C. voltage proportional to the pulse duration is formed.

With a sequence of triggering pulses $V_6$ having a period $T_1=1$ msec. applied to terminal 58, and a sequence of additional pulses $V_8$ with a period $T_2=100$ $\mu$sec. sent to terminal 59, the system had 10 stable states. With a change in $T_1$ up to 1.5 msec., the number of stable states changed up to 15.

The use of the biased multivibrator with a linear characteristic of control in the system makes it possible to obtain a linear increase in output voltage which is particularly important when a multistable system is used in analog-to-digital and digital-to-analog converters.

The block-diagram of a simpler version of the time-pulse multistable element (chronotron) is shown in FIG. 15 and consists of comparator 60 (or alternatively, for example, a trigger-shaper or a D.C. amplifier with a high gain factor), integrator 61 and feedback unit 62. External triggering voltage $V_9$, which is shown in FIG. 16a versus time, is applied to the comparator input through terminal 63. In this case, a smooth change in control voltage $V_{in}$ results in a sudden change in the moment of the trigger transition from "zero" state to "unity" state (FIG. 16b). Since the reverse transition always coincides in time with the triggering voltage trailing edge, in this case, a discrete change in trigger output pulse duration $\tau$ occurs. When performing a linear conversion of pulse $V_\tau$ duration into a value of D.C. voltage $V_{out}$, there is obtained a nonlinear four-pole network with stepped amplitude characteristic, and when a positive feedback loop is provided, a time-pulse multistable element can be designed. Pulse duration $\tau_i$ (FIG. 16b) corresponding to the stable states of such an element, depends only on the triggering voltage $V_9$ step duration, and therefore a high stability of dynamic state characteristic unaffected by the circuit parameters can be obtained.

The schematic circuit diagram of one of the chronotron versions according to the block-diagram of FIG. 15 is shown in FIG. 17. Here, there is used as a comparator or adjustable duration square pulse shaper, a trigger, employing transistors 64 and 65 with an emitter coupling. The trigger pulse duration is controlled by varying the voltage at point 66.

The number of stable states of the chronotron as given in FIG. 17 is deterimined by the parameters of a signal applied to terminal 67 (by the number of steps). The values of the capacitor 68 voltage and these of pulse duration at point 69 in a ten-stable state element are given in Table 1.

TABLE 1

| | 1 | 2 | 3 | 4 | 5 | 6 | 7 | 8 | 9 | 10 |
|---|---|---|---|---|---|---|---|---|---|---|
| Msec | 25 | 50 | 75 | 100 | 125 | 150 | 175 | 200 | 225 | 250 |
| Vout | 1.4 | 2.8 | 4.2 | 5.6 | 7.0 | 8.4 | 9.8 | 11.2 | 12.6 | 14 |

As it can be seen from the table, the pulse duration and voltage value with the element passing from one state to another, is changed strictly linearly. The use of the trigger output pulses limitation before their integration permits obtaining a highly stable chronotron, the efficiency of which is not disturbed with supply voltage changing within $\pm 20\%$.

Hereinabove, have been considered different ways of designing a chronotron, i.e. a triggering device having many stable states of dynamic equilibrium, which differ in the duration of square pulses.

When using a chronotron in a different system it is necessary to provide its reliable passing from one state to another according to the preset program. In the simplest case when designing the conversion circuits, it is necessary to ensure switching of the chronotron from any state to an adjacent one. This can be done, for example, by sending a triggering pulse to the voltage-to-pulse time parameter converter input (FIG. 2) or to the feedback unit.

The control techniques in the conversion mode allow setting the chronotron to any of the possible stable states by applying a pulse train, the characteristic of a stable state being a physical presentation of the required number.

However, in the general case, when the chronotron does not perform the function of a conversion cell, such a method of recording numbers is not appropriate.

Recording of a number into the chronotron can be accomplished by sending a train of square pulses of a certain duration to the voltage-to-pulse time parameter converter input.

Next will be considered the method of recording a digit in the chronotron shown in FIG. 17.

A train of square driving pulses, the amplitude of which exceeds the amplitude of triggering voltage $V_9$, is applied to the trigger input (terminal 70). The high amplitude of the driving pulses results in the trigger being insensitive to the pulses at points 66 and 67, and its state is completely determined by the parameters of these pulses. The duration of the trigger output pulses will coincide with the duration of the driving pulses. As a result of this, a D.C. voltage will be established at point 66, the value of which will correspond to the duration recorded. After the train of driving pulses is completed, this voltage maintains the trigger output pulse duration corresponding to the duration in the adjacent stable state.

The whole range of driving pulse duration values corresponds to setting an element in each stable state. Table 2 gives the values of $\tau$ corresponding to setting an $n$-stable element into state $i$.

TABLE 2

| n | 1:1(μsec.) | 2 | 3 | 4 | 5 | 6 |
|---|---|---|---|---|---|---|
| 6 | 10 | 10–30 | 30–50 | 50–70 | 70–90 | 90 |
| 8 | 7.1 | 7.1–21 | 21–35 | 35–49 | 49–64 | 64–78 |
| 10 | 5.5 | 6–17 | 17–28 | 28–39 | 39–50 | 50–61 |
| 12 | 4.5 | 4.5–14 | 14–23 | 23–32 | 32–41 | 41–50 |

As can be seen from the data presented in the table, the chronotron which is a device having many stable states of dynamic equilibrium, differing in pulse duration, can provide a reliable storage of recorded information and a reliable transition from one state to another.

Though the present invention is described in connection with its preferred embodiments, it is evident that changes and modifications can be made without departing from the spirit and scope of the invention as well be easily understood by those skilled in the art.

Such changes and modifications are considered as falling within the spirit and scope of the invention and the appended claims.

What is claimed is:

1. A device having a dynamic output and many stable states of dynamic equilibrium which differ in the duration of pulses at the dynamic output, in which device the number of the active and passive elements does not depend on the number of stable states, the device being in the form of a four-pole network with a non-linear amplitude characteristic, said device comprising a D.C. voltage-to-time parameter converter in the form of an adjustable delay unit including a control input and a further input, and a time parameter-to-D.C. voltage converter connected in series with said first converter and consisting of a key gating circuit and an integrator unit connected to said circuit, the second said converter including an output connected with the control input of said adjustable delay unit; and means feeding to said further input of the delay circuit a triggering voltage and to the gating circuit an additional voltage synchronized with the triggering voltage and the character of change in which defines the form of the four-pole network amplitude characteristic.

2. A device having a dynamic output and many stable states of dynamic equalibrium which differ in the duration of pulses at the dynamic output, in which device the number of active and passive elements does not depend on the number of stable states, said device comprising an adjustable delay unit including an input and in the form of an electromagnetic line including nonlinear capacitors, means applying to the input a triggering voltage, a gating circuit comprising a transistor including an emitter, means applying to the emitter an additional voltage synchronized with the triggering voltage, a choke, and an integrator including an output connected to the input of said electromagnetic line through said choke, said transistor further including a base coupled to said delay unit and a collector coupled to said integrator.

3. A device having a dynamic output and many stable states of dynamic equilibrium, which differ in the duration of pulses at the dynamic output, in which device the number of active and passive elements does not depend on the number of stable states, said device comprising an adjustable delay unit in the form of a diode-regenerative comparator including an input, means for applying to the input of said comparator a sawtooth triggering voltage; a gating circuit including an electronic tube including a cathode, means applying to the cathode an additional voltage synchronized with the triggering voltage, said comparator further including a control input, and an integrator including an output connected to the control input of said comparator, said tube further including a grid coupled to said delay line and an anode coupled to said integrator.

4. A device having a dynamic output and many stable states of dynamic equilibrium, which differ in the duration of pulses at the dynamic output, in which the number of active and passive elements does not depend on the number of stable states, said device comprising a D.C. voltage-to-time parameter converter consisting of a shaper of rectangular pulses with adjustable duration and a differentiating circuit including an input to which signals from said shaper are applied, said shaper including two inputs and a time parameter-to-D.C. voltage converter consisting of an oscillatory circuit with a natural frequency several times the repetition frequency of the pulses of said shaper, a detector including a smoothing filter and a D.C. amplifier which are connected in series, said amplifier including an output connected to one of the inputs of said shaper, and means applying to the other input of the shaper a periodic sequence of triggering pulses which determines the repetition frequency of said shaping pulses; said oscillatory circuit and the first said converter being connected in series.

5. A device having a dynamic output and many stable states of dynamic equilibrium, which differ in the duration of pulses at the dynamic output in which the number of active and passive elements does not depend on the number of stable states, said device comprising connected in series: a shaper of square pulses of adjustable duration in the form of a one-shot multivibrator including an input, means applying to the input triggering pulses, a differentiating capacitor, a parallel oscillatory circuit with a natural frequency several times exceeding the pulse repetition frequency of said one-shot multivibrator, said shaper further including a control input, a detector and an amplifier including two transistors and a smoothing filter, the amplifier including an output connected to the one-shot multivibrator control input.

6. A device having a dynamic output and many stable states of dynamic equilibrium, which differ in duration of pulses at the dynamic output, in which the number of active and passive elements does not depend on the number of stable states, said device comprising a D.C. voltage-to-time parameter converter having a non-monotonic conversion characteristic and including a one-shot multivibrator including a plurality of inputs, means applying to one of the inputs a triggering voltage and to another of the inputs an additional voltage synchronized with said triggering voltage, and a time parameter-to-D.C. voltage converter with a linear conversion characteristic, in the form of an integrator, and means coupling the output voltage of said integrator to the one-shot multivibrator to control duration of the output pulses of said one-shot multivibrator; said converters being connected in series.

References Cited
UNITED STATES PATENTS

| 2,810,072 | 10/1957 | Amatniek | 328—205 |
| 3,253,158 | 5/1966 | Horgan | 307—88.5 |
| 3,270,288 | 8/1966 | Hackett | 328—63 |
| 3,283,256 | 11/1966 | Hurowitz | 328—147 |
| 3,292,100 | 12/1966 | Berlind | 331—45 |
| 2,487,510 | 11/1949 | Baker | 328—127 |
| 2,542,160 | 2/1951 | Stoner et al. | 328—127 |
| 2,922,041 | 1/1960 | Boyle | 328—186 X |
| 3,119,070 | 1/1964 | Seliger | 328—127 X |
| 3,246,175 | 4/1966 | Baldwin | 328—205 X |
| 3,246,247 | 4/1966 | Grindle | 328—127 X |
| 3,222,550 | 12/1965 | Willard et al. | 307—273 X |
| 3,304,437 | 2/1967 | Dano | 328—127 X |

WARREN E. RAY, *Primary Examiner.*

U.S. Cl. X.R.

307—277, 234, 265, 272; 328—127, 186